United States Patent Office 3,202,701
Patented Aug. 24, 1965

3,202,701
COMPLEX ESTER OF MIXED DICARBOXYLIC ACIDS, NEOPENTYL GLYCOL AND ALIPHATIC ALCOHOLS
David W. Young, Homewood, and Eileen M. Paré, Park Forest, Ill., assignors, by mesne assignments, to Sinclair Research, Inc., New York, N.Y., a corporation of Delaware
No Drawing. Original application Dec. 17, 1957, Ser. No. 703,275. Divided and this application May 31, 1961, Ser. No. 124,251
7 Claims. (Cl. 260—485)

This application is a division of our application Serial No. 703,275, filed December 17, 1957, now abandoned.

This invention relates to a synthetic complex ester. In another aspect, this invention pertains to a synthetic lubricant composition containing a diester blended with the complex ester.

In an effort to obtain superior lubricating compositions having specific and unusual characteristics, new synthetic lubricants have been developed. In general, these lubricating compositions are characterized by higher viscosity indices, lower pour points and greater heat stability than mineral oils of corresponding viscosity. Lubricants possessing such properties are of special value in the lubrication of engines which are subjected to high temperatures such as aircraft combustion turbine engines, which also frequently must start up under extremely low atmospheric temperature conditions. Mineral oil lubricants containing viscosity index improvers, pour point depressors, or other additives are undesirable for use in such engines because of their volatility, low flash point and tendency to leave a residue which accumulates and interferes with the operation of the engine.

Various naturally occurring esters have been used as lubricants. In addition, synthetic diesters, formed by the reaction of a dibasic acid with a monohydroxy alcohol, are known to possess good viscosity-temperature curves and low pour points. An example of a diester which has obtained some commercial use as a lubricant is di-2-ethylhexyl sebacate. The use of such diesters is handicapped by the fact that a wide viscosity range of lubricants of suitable properties cannot be made from readily available materials.

In an effort to overcome some of these difficulties complex esters have been developed, such as those reported in U.S. Patent No. 2,703,811. These esters are of the type X—Y—Z—Y—X in which X represents a mono-alcohol residue, Y represents a dicarboxylic acid residue and Z represents a glycol residue and the linkages are ester linkages. These esters have been found to be especially adaptable to the conditions to which aircraft turbine engines are exposed, since they can be formulated to give a desirable combination of high flash point, low pour point, and high viscosity at elevated temperatures, and need contain no additives which might leave an undesirable residue upon volatilization. In addition, many complex esters have shown good stability to shear.

In order to achieve the most advantageous viscosity characteristics complex esters are frequently blended with diesters to produce lubricating compositions of wide viscosity ranges which can be "tailor made" to meet various specifications. This blending is performed for example by stirring together a quantity of diester and complex ester at an elevated temperature, altering the proporions of each component until the desired viscosity is reached.

A difficulty encountered when using blends of diesters with complex esters of the type mentioned is that many such blends lack heat stability due to breakdown of the complex ester component at elevated temperatures. When subjected to a heat soak test wherein samples of the complex ester or the blend are held at an elevated temperature for a period of five to ten hours at a temperature of 547° F. to 550° F. many such compositions show a tendency to decompose. However, this tendency is materially lessened in blends where the "Z" component of the complex is the residue from neopentyl glycol. It is hypothesized that the use of a dibasic acid which contains more carbon atoms in the chain between the carboxyl groups improves heat stability and it also has been found that the number of carbon atoms in the chain between the carboxyl groups has an effect upon the viscosity index of the finished blend.

Some recent specifications such as the Allison EMS-35E specification have more stringent requirements than specifications which have been met heretofore by blended ester type lubricants. The Allison specification viscosity requirements are a maximum of 13,000 centistokes at −40° F. with a desired minimum viscosity of 7.5 centistokes at 210° F. It has also been found that lubricants which meet this specification are not acceptable unless they have the proper cold stability—that is, the lubricants must remain clear when stored for 72 hours at −40° F.

It has now been found, and comprises the improvement to which this invention is directed, that if the neopentyl glycol-based complex is made from a mixture of sebacic acid and another dibasic acid in a certain range of proportions, it is possible to produce a lubricant which remains relatively haze-free when stored at −40° F. for 72 hours, has satisfactory heat stability and has good viscosity characteristics, even in some cases permitting formulations to meet the Allison EMS-35E specifications. We cannot determine the structures and amounts of each ester type contained in the final product, so that the complex ester and the lubricant compositions which contain it are best described in terms of the reactants used in the manufacture of the complex.

The dibasic acid component other than sebacic acid has from 6 to 12 carbon atoms and may comprise any straight chain saturated dicarboxylic acid such as adipic, pimelic, suberic, or azelaic acids. Homologs of these acids, for instance, those containing alkyl side chains, are also effective in the lubricating compositions of the invention, although the esterification reaction takes longer when branched chains are present in the acid. Azelaic, suberic and adipic acids, and mixtures of these acids, are the preferred dibasic acid components of the complex aside from the sebacic acid.

The total amount of dicarboxylic acids in the reaction mixture must contain at least about 50 percent sebacic acid, and may contain up to about 90 percent sebacic acid, and thus the other dibasic acid may be about 10 to 50 percent of the total dicarboxylic acids. This means that there is at least about one mole of sebacic acid to each mole of neopentyl glycol in the reaction mixture. When azelaic acid is used as the other acid, it can advantageously be about 15 to 35 percent of the total acids component.

The other dicarboxylic acid to be used with sebacic acid to make up the two moles of dicarboxylic acid for each mole of neopentyl glycol may be a commercially available composite of $C_{10}$ dicarboxylic acids. This mixture contains an average of 8 percent sebacic acid, 15 percent $\alpha,\alpha'$-diethyl adipic acid and 77 percent $\alpha$-ethyl suberic acid. Exact analysis of this $C_{10}$ acid composite may show 6 to 10 percent sebacic acid, 23 to 18 percent $\alpha,\alpha'$-diethyl adipic acid and 72 to 80 percent $\alpha$-ethyl suberic acid. The composition of this mixture will be treated herein as the average composition. This composite of acids is attractive from the viewpoint of economy and availability since it is made from petroleum hydrocarbons rather than the natural oils and fats which are used in the manufacture of many other dicarboxylic acids, which natural oils and fats are frequently in short supply and costly. When this composite of $C_{10}$ dicarboxylic acids is used, allowance in making up the proportions of acids must be made for the presence of some sebacic acid in the composite. When this composite is used the total acids of a reaction mixture is preferably about 10 to 30 percent of dibasic acid other than sebacic.

The monohydric alcohol of the complex ester can be a $C_5$ to $C_{13}$ primary alcohol with a straight or branched chain and these include primary monoalcohols and ether primary monoalcohols, $C_8$ to $C_{10}$ branched chain primary alcohols are preferred, since the low temperature viscosity of the finished lubricant composition seems to be improved with some branching of the alcohol. Alcohols such as n-decanol, 2-ethylhexanol, "oxo" alcohols, prepared by the reaction of carbon monoxide and hydrogen upon the olefins obtainable from petroleum products such as diisobutylene and $C_7$ olefins, ether alcohols such as butyl carbitol, tripropylene glycol mono-isopropyl ether, and dipropylene glycol mono-isopropyl ether, are suitable alcohols for use in the reaction to produce the desired complexes.

The diesters of lubricating viscosity with which these complexes are to be blended are of the type alcohol-dicarboxylic acid-alcohol. The alcohol component usually comprises an aliphatic monohydroxy alcohol containing up to about 20 carbon atoms, saturated or unsaturated, straight or branched chain, which may or may not contain ether oxygen atoms. Such alcohols are typified by the following: methanol, ethanol, n-butyl alcohol, n-hexyl alcohol, n-octyl or iso-octyl alcohol, 2-ethylhexyl alcohol, cetyl alcohol, oleyl alcohol, ethylene glycol mono-n-butyl ether, $C_{10}$ oxo-alcohol, butyl carbitol and $C_{13}$ oxo-alcohol. The preferred alcohols are those of 6 to 12 carbon atoms.

The dibasic acid component of the diester generally contains 2 to 12 carbon atoms, particularly the aliphatic acids, such as adipic, azelaic, suberic, alkenylsuccinic, sebacic, etc. Preferably the dibasic acid is of 6 to 12 carbon atoms.

In addition to di-2-ethylhexyl sebacate another economically attractive diester is diisooctyl azelate (DiOAz). This is a product made by the esterification of azelaic acid with an alcohol mixture made by the oxo process from $C_3$ to $C_4$ copolymer heptanes. This alcohol mixture contains 17 percent 3,4-dimethylhexanol; 29 percent 3,5-dimethylhexanol; 25 percent 4,5-dimethylhexanol; 1.4 percent 5,5-dimethylhexanol; 16 percent of a mixture of 3-methylheptanol and 5-methylheptanol; 2.3 percent 4-ethylhexanol; 4.3 percent $\alpha$-alkyl alkanols and 5 percent other materials. Some other specific diesters with which the novel complex neopentyl glycol esters of the invention may be blended are di-(1,3-dimethyl-butyl) adipate, di-(2-ethylbutyl) adipate, di-(1-ethylpropyl) adipate, diethyl oxalate and di(undecyl) sebacate.

The diesters of lubricating viscosity are blended with the complex esters by stirring together a quantity of diester and complex ester at an elevated temperature, altering the proportions of each component until the desired viscosity is reached. The finished blend will contain about 60 to 90 percent of the complex ester— usually about 70 to 85 percent. Thus, the diester will be about 10 to 40 percent, preferably about 15 to 30 percent of the blend. The blend can also include up to about 1 percent by weight of an oxidation inhibitor, such as phenothiazine and may also contain a foam inhibitor such as "DCF" or other additives to provide a particular characteristic. "DCF" is a liquid methyl silicone polymer having a viscosity of 60,000 at 25° C.

The complex esters of this invention are made by either a one-stage or a two-stage reaction. In method I, one mole of neopentyl glycol, 2 moles of the mixture of dibasic acids, 2 moles of the monohydroxy alcohol and about 0.05 to 0.5 percent of a catalyst are added to just enough solvent, such as xylene or toluene, to dissolve the soluble components. This mixture is reacted in a flask fitted with a water trap and a reflux condenser at a temperature of 100 to 140° C. when using toluene, or even up to about 195° C. when xylene is employed, and the reaction continued under reflux until the theoretical amount of water is collected. Then, to reduce the acid number, a 10 percent excess of the monohydroxy alcohol is added, with continued heating, until water once more ceases to be evolved. The sample is filtered and then stripped at 2 to 5 mm. Hg and an elevated temperature to remove solvent, water and unreacted constituents.

In method II, 2 moles of monohydroxy alcohol and 2 moles of the mixture of dibasic acids are reacted at a temperature between 100 and 190° C. while refluxing in the presence of a toluene or xylene solvent and 0.05 to 0.5 percent of a catalyst. When water ceases to be collected in the trap, one mole of neopentyl glycol is added and the reaction is resumed. This reaction, too, is terminated when no more water is collected. This product is then filtered and stripped at 2 to 5 mm. Hg and an elevated temperature to remove water, solvent and unreacted constituents.

The complexes produced by each of these methods can, if desired, be after-treated by washing with a 5 percent aqueous $K_2CO_3$ solution to reduce the acid number, or they can be heated in an autoclave for fifteen hours at 340 to 350° F. with 10 weight percent of propylene oxide and then filtered.

The following examples are to be considered illustrative and not limiting.

EXAMPLE A

A sample was prepared by reacting neopentyl glycol (104 g.) with sebacic acid (282.8 g.), azelaic acid (121.2 g.) and 2-ethyl hexanol (260 g.) using sodium acid sulfate (38 g.) and xylene as the catalyst and solvent, respectively. The completed reaction product was treated with a 10 percent excess of the alcohol to further reduce the acid number. The product was filtered, stripped to 400° F. and 2 to 5 mm. Hg, and propylene oxide treated. Pertinent data are reported in Table I. A blend of 85 percent of the sample and 15 percent Plexol 201 was made. Data relating to this blend are also reported in Table I.

EXAMPLE B

A sample was prepared by reacting 2-ethylhexanol (268 g.) with azelaic acid (161.6 g.) and sebacic acid (242.4 g.) using sodium acid sulfate (3.3 g.) as the catalyst and xylene as the solvent. When this reaction was complete neopentyl glycol (107 g.) was added and the theoretical water yield obtained whereupon a 10 percent excess of the alcohol was added and heating continued until water was no longer obtained. The sample was filtered and stripped at 400° F. and 2 to 5 mm. Hg. After a propylene oxide treat the data reported in Table I were obtained. A blend of 80 percent of this sample in 20 percent Plexol 201 had properties also reported in Table I.

EXAMPLE D

Neopentyl glycol (416 g.) was reacted with sebacic acid (1372 g.), the commercial $C_{10}$ acids composite (242 g.) butyl carbitol (850 g.) and 2-ethylhexanol (360 g.) using a titanate catalyst (22.4 g.) and xylene as the solvent. The ratio of dibasic acids was 85 percent sebacic to 15 percent of the commercial $C_{10}$ acids composite. This gave an actual ratio of 86.2 percent sebacic to 13.8 percent of a composite of 84 percent α-ethylsuberic acid and 16 percent of α-α'-diethyl adipic acid, or a ratio of 86.2 sebacic to 11.6 α-ethylsuberic to 2.2 α-α'-diethyl adipic. The titanate catalyst was a composition containing approximately equal amounts of di-2-ethylhexyl sebacate and a polymer formed by the hydrolysis of tetra-(2-ethyl-1,3-hexanediol)-titanate. When the theoretical water yield was obtained, a 10 percent excess of 2-ethylhexanol was added to the reaction mixture and heating continued until water was no longer obtained. The sample was filtered and then stripped at 400° F. and 2 to 5 mm. Hg. Inspections obtained on this product are reported in Table I. This sample (68 percent) was blended with Plexol 201 (31.5 percent), 0.5 percent phenothiazine and 0.001 percent "DCF" foam inhibitor. See Table I for data.

EXAMPLE E

The complex ester was made by reacting 4 moles neopentyl glycol (416 g.), sebacic acid (6.4 moles, 1293 g.), $C_{10}$ acids composite (1.6 moles, 301 g.), 2-ethylhexanol (4 moles, 520 g.), and butyl carbitol (4 moles, 648 g.). The solvent was xylene (300 g.) and the catalyst was sodium acid sulfate (0.5 percent, 16 g.). After the one-stage reaction, the solvent was stripped at 400° F. and 2 to 5 mm. Hg. The sample was not propylene oxide treated. The physical properties of this complex are reported in Table I. Three parts of this sample was blended with one part DiOAz. The remainder of the sample was blended in the same proportions with Plexol 201. The physical properties of these blends are given in Table I. The low temperature clarities were determined by subjecting the complex ester or blend to storage for 72 hours at −40° F.

*Table I*

| Sample | A | B | C | D | E | |
|---|---|---|---|---|---|---|
| Alcohol | 2-ethylhexanol | 2-ethylhexanol | 2-ethylhexanol | 65.5% butylcarbitol, 34.5% 2-ethylhexanol. | 50% butylcarbitol, 50% ethylhexanol. | |
| Dibasic acids ratio | 70 sebacic/30 azelaic | 58.2 sebacic/41.8 azelaic | 85 sebacic/15 azelaic | 86.2 sebacic/11.6 α-ethylsuberic/2.2 α-α'-diethyladipic. | 80 sebacic/20 azelaic. | |
| Method of making | I | II | I | I | I. | |
| Solvent | Xylene | Xylene | Xylene | Xylene | Xylene. | |
| Catalyst | NaHSO₄ | NaHSO₄ | NaHSO₄ | Titanate [5] | NaHSO₄. | |
| After treat | C₃H₆O [1] | C₃H₆O [1] | None | None | None. | |
| Stripping temperature | 400° F | 400° F | 400° F | 400° F | 400° F. | |
| V.I. | 145 | 145 | 144 | 147 | 147. | |
| KV, cs. at— | | | | | | |
| 210° F | 8.931 | 8.963 | 9.863 | 11.25 | 10.42. | |
| 100° F | 49.08 | 49.51 | 56.15 | 62.40 | 57.26. | |
| −40° F | | 24,648 [3] | 24,327 | 32,701 | 24,069. | |
| Low temp. clarity | Yes | Yes | Yes | Yes | Yes. | |
| Pour point, °F | <−80 | <−80 | <−80 | <−70 | <−80. | |
| Flash point, °F | 390 | 465 | 455 | 415 | 450. | |
| Acid number | 0.03 | 0.04 | 1.89 | 0.12 | 1.82. | |

| | Blends | | | | | |
|---|---|---|---|---|---|---|
| Diester | Plexol 201 [2] | Plexol 201 | Plexol 201 [4] | Plexol 201 [4] | DiOAz | Plexol 201. |
| Percent complex in blend | 85 | 80 | 75 | 68 | 75 | 75. |
| V.I. | | | | 153.9 | | |
| KV, cs. at— | | | | | | |
| 210° F | 7.535 | 7.290 | 7.642 | 7.644 | 7.724 | 8.011. |
| 100° F | 38.28 | 36.86 | 40.62 | 37.46 | 38.14 | 39.70. |
| −40° F | 13,052 | 13,102 | 12,482 | 11,892 | 11,134 | 12,656. |
| Low temp. clarity | Yes | Yes | Yes | Yes | Yes | Yes. |
| Pour point, °F | | | | <−80 | | |
| Flash point, °F | | | | 490 | | |

[1] Propylene oxide.
[2] Plexol 201 is a di-2-ethylhexyl sebacate containing 0.02% free sebacic acid having a kinematic viscosity at 100° F. of about 12.7 centistokes, a viscosity index of 154, a pour point of below −80° F. and an acid number of 0.12.
[3] Measured before propylene oxide treat.
[4] Blend also includes 0.5% phenothiazine and 0.001% "DCF" foam inhibitor.
[5] The catalyst used was a composition containing approximately equal amounts of di-2-ethylhexyl sebacate and a polymer formed by the hydrolysis of tetra-(2-ethyl-1,3-hexanediol)-titanate.

It can thus be seen from the data presented in Table I that by using a mixture of diabasic acids containing about 50 to 90 percent sebacic acid and about 10 to 50 percent of another dibasic acid containing 6 to 12 carbon atoms, a complex ester can be produced with neopentyl glycol which, when the complex is blended with a diester, yields a lubricating composition which has good viscosity characteristics, even in some cases sufficient to meet the Allison specification, while providing cold stability. These compositions also have good heat stability. These results are not obtained, however, when only a single dibasic acid is used in making the complex or when a mixture of acids is used which does not contain at least about 50 percent sebacic acid. Some representative complexes and blends of these types are reported in Table II. All of the blends contain 0.5 percent phenothiazine and 0.001 percent "DCF" foam inhibitor.

Table II

| Sample | F | G | H | J | K | L |
|---|---|---|---|---|---|---|
| Acid | Sebacic | Azelaic | C₁₀ composite [3] | C₁₀ composite [3] | Sebacic | Adipic. |
| Method of making | II | II | II | II | I | I. |
| Solvent | Toluene | Toluene | Toluene | Toluene | Xylene | Toluene. |
| Catalyst | Ptsa [1] | Ptsa | Ptsa | Ptsa | Alumina | NaHSO₄. |
| After treat | K₂CO₃ | C₃H₆O [2] | C₃H₆O [2] | C₃H₆O [2] | K₂CO₃ | K₂CO₃. |
| Stripping temperature | 482° F | 400° F | 400° F | 482° F | 482° F | 350° F.[5] |
| V.I. | 145 | 149 | | 128 [4] | | |
| KV, cs. at— | | | | | | |
| 210° F | 9.353 | 7.445 | | 8.283 | 11.56 | 6.462. |
| 100° F | 52.18 | 38.58 | | 53.86 | 66.67 | 34.66. |
| −40° F | 20,879 | 14,943 | | | 33,949 | 19,921. |
| Low temp. clarity | No | Yes | | Yes | No | Yes. |
| Pour point, °F | <−80 | <−80 | | −74 | −78 | −80. |
| Flash point, °F | 490 | 390 | | | 495 | 460. |
| Acid number | 0.03 | 0.06 | | 0.07 | 0.01 | .27. |
| Blends | | | | | | |
| Percent complex | 75 | 99.5 | | 90 | 70 | 75. |
| V.I. | 150.9 | 145.7 | | 127.5 | 151.1 | 134.2. |
| KV, cs. at— | | | | | | |
| 210° F | 7.215 | 7.703 | | 7.682 | 7.994 | 5.42. |
| 100° F | 36.30 | 41.26 | | 48.52 | 40.67 | 28.9. |
| −40° F | 11,482 | 17,627 | | 41,645 | 12,769 | 10,294. |
| Low temp clarity | No | Yes | | Yes | No | Yes. |
| Pour point, °F | <−80 | <−80 | | −75 | <−80 | <−80. |
| Flash point, °F | 485 | 455 | | 475 | 485 | 475. |
| Acid number | 0.0 | 0.06 | | 0.002 | 0.003 | 0.22. |

[1] Paratoluene sulfonic acid.
[2] Propylene oxide.
[3] Composition: 6–10% suberic acid; 12–18% α-α′-diethyl adipic acid; 72–80% α-ethylsuberic acid.
[4] Figures are given for a mixture of 50% complex H and 50% complex J.
[5] Half of reaction mixture stripped at 400° F., and half at 482° F., the two halves combined, washed, and stripped again at temperature indicated.

It is seen from Table II (F and K) that the most satisfactory complex, from the viscosity standpoint, is 2-ethylhexyl-sebacate-neopentyl glycol - sebacate - 2 - ethylhexyl. Lubricating compositions can be made using this complex which have viscosity characteristics meeting the Allison specifications. However, it will be noted that this complex and the lubricants made from it are not clear when stored at −40° F. for 72 hours. The haze which develops is not obtained in complexes which use other single dicarboxylic acids or the commercial C₁₀ acid composite. Although the complex esters which use these other acids or the composite can be blended with a diester such as Plexol 201 to produce lubricating compositions which meet the MIL-L-9236 specification for high temperature service, where mineral oils run dirty, these blends do not have viscosity characteristics as advantageous as those containing the complex ester made from sebacic acid. Only by using a dicarboxylic acid component comprising at least about 50 percent sebacic acid could complex esters made with neopentyl glycol be found to produce lubricant blends having the desired viscosity characteristics, which can even be sufficient to meet the Allison EMS-35E specifications, and only by having at least 10 percent of other dicarboxylic acid or a composite of other dicarboxylic acids in the total amount of dicarboxylic acid present in the complex esterification, could the objectionable hazing characteristics of the blend be overcome. These other dicarboxylic acids have the ability to overcome or inhibit this hazing tendency even when they are present in very minor quantities. As shown by Table II, variation in the catalyst, solvent or steps in the esterification reaction are not effective to stop hazing or to produce complexes having the proper viscosity characteristics when the major dicarboxylic acid component is not sebacic acid.

When indicating percentages, we refer to percent by weight except in designating the complex ester and diester components in the blends which are stated as percent by volume based on these two components.

We claim:

1. A complex ester of a dicarboxylic acid component, a primary alcohol containing 5 to 13 carbon atoms and selected from the group consisting of primary monohydric alkanols and ether primary monohydric alkanols, and neopentyl glycol, in the approximate molar ratio of 2 to 2 to 1, respectively, wherein said dicarboxylic acid component comprises about 50 to 90 percent sebacic acid, the balance consisting essentially of a straight chain acid other than sebacic acid having a saturated aliphatic hydrocarbon chain of 4 to 10 carbon atoms and two carboxyl groups.

2. The complex ester of claim 1 in which the primary alkanol is a branched chain alcohol of 8 to 10 carbon atoms.

3. The complex ester of claim 1 in which the acid, other than sebacic acid, is azelaic acid.

4. The complex ester of claim 3 wherein the acid mixture comprises about 65 to 85 percent sebacic acid.

5. The complex ester of claim 3 in which the primary alcohol is butyl carbitol.

6. The complex ester of claim 5 wherein the mixture of dibasic acids comprises about 65 to 85 percent sebacic acid.

7. The complex ester of claim 3 in which the primary alcohol is 2-ethyl hexanol.

References Cited by the Examiner

UNITED STATES PATENTS

| 2,499,984 | 3/50 | Beavers et al. | 260—485 |
| 2,703,811 | 3/55 | Smith | 260—485 |
| 2,744,877 | 5/56 | Smith | 260—485 |

LORRAINE A. WEINBERGER, *Primary Examiner*.

ABRAHAM H. WINKELSTEIN, LEON ZITVER, *Examiners*.